United States Patent
Regev et al.

(10) Patent No.: US 10,326,480 B2
(45) Date of Patent: Jun. 18, 2019

(54) COMMUNICATION RECEIVER AND METHOD

(71) Applicant: HUAWEI TECHNOLOGIES CO., LTD., Shenzhen, Guangdong (CN)

(72) Inventors: Dror Regev, Hod Hasharon (IL); Shimon Shilo, Hod Hasharon (IL); Doron Ezri, Hod Hasharon (IL); Chirn Chye Boon, Munich (DE); Xiang Yi, Munich (DE); Junping Zhang, Shenzhen (CN); Gengen Hu, Shenzhen (CN); Dong Liang, Shenzhen (CN); Sheng Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/803,002

(22) Filed: Nov. 3, 2017

(65) Prior Publication Data

US 2018/0054221 A1 Feb. 22, 2018

Related U.S. Application Data

(63) Continuation of application No. PCT/EP2015/059859, filed on May 5, 2015.

(51) Int. Cl.
*H04B 1/00* (2006.01)
*H04B 1/18* (2006.01)

(52) U.S. Cl.
CPC ......... *H04B 1/0053* (2013.01); *H04B 1/0075* (2013.01); *H04B 1/18* (2013.01); *H04B 1/006* (2013.01)

(58) Field of Classification Search
CPC ...... H04B 1/18; H04B 1/0053; H04B 1/0075; H04B 1/006
See application file for complete search history.

(56) References Cited

U.S. PATENT DOCUMENTS

| 5,920,589 A * | 7/1999 | Rouquette | H04B 1/707 375/147 |
| 6,427,068 B1 * | 7/2002 | Suominen | H03D 3/007 455/150.1 |

(Continued)

OTHER PUBLICATIONS

Ericsson et al.: "LO coupling issues for NC intra-band CA," 3GPP TSG-RAN WG4 Meeting #62bis, Jeju Island, Korea, Mar. 19, 2012, R4-121361.

(Continued)

*Primary Examiner* — Robert M Morlan
(74) *Attorney, Agent, or Firm* — Staas & Halsey LLP

(57) ABSTRACT

The communication receiver comprises a mixer being configured to mix the communication signal with a periodic mixing signal having a mixing frequency $f_C$ to obtain a mixed communication signal, wherein the mixed communication signal comprises a first frequency spectrum portion comprising the spectral region of interest being situated around a frequency $f_{RF}+f_C$ and a second frequency spectrum portion comprising the spectral range of interest being situated around $f_{RF}-f_C$; a first demodulator being configured to demodulate a first frequency channel of the plurality of frequency channels within the spectral range of interest of the first frequency spectrum portion on the basis of a first local oscillator frequency $f_{LO1}$; and a second demodulator being configured to demodulate a second frequency channel of the plurality of frequency channels within the spectral region of interest of the second frequency spectrum portion on the basis of a second local oscillator frequency $f_{LO2}$.

15 Claims, 9 Drawing Sheets

(56) References Cited

U.S. PATENT DOCUMENTS

| | | | | |
|---|---|---|---|---|
| 7,606,549 B2* | 10/2009 | Suominen | ............... | H03D 3/007 |
| | | | | 455/258 |
| 8,532,162 B2* | 9/2013 | Yahya | ................... | H04B 1/406 |
| | | | | 375/219 |
| 2004/0087279 A1* | 5/2004 | Muschallik | ............... | H04B 1/30 |
| | | | | 455/73 |
| 2007/0047669 A1* | 3/2007 | Mak | ....................... | H03D 3/007 |
| | | | | 375/316 |
| 2014/0011464 A1* | 1/2014 | Anderson | .............. | H04B 1/525 |
| | | | | 455/78 |
| 2014/0051441 A1* | 2/2014 | Wilhelmsson | ........... | H03D 7/18 |
| | | | | 455/436 |
| 2014/0194081 A1* | 7/2014 | Tohidian | .............. | H04B 1/0007 |
| | | | | 455/258 |
| 2016/0329921 A1* | 11/2016 | Jussila | .................. | H03B 27/00 |

OTHER PUBLICATIONS

Ericsson et al.: "Scenarios for non-contiguous intra-band CA," 3GPP TSG-RAN WG4 Meeting #61, San Francisco, California, USA, Nov. 7, 2011, R4-115583.

Park Chester et al.: "Carrier Aggregation for LTE-Advanced: Design Challenges of Terminals," IEEE Communications Magazine, IEEE Service Center, Piscataway, US, vol. 51, No. 12, Dec. 1, 2013, pp. 76-84, XP011534261.

International Search Report dated Feb. 5, 2016 in corresponding International Patent Application No. PCT/EP2015/059859.

Written Opinion of the International Searching Authority dated Feb. 5, 2016 in corresponding International Patent Application No. PCT/EP2015/059859.

* cited by examiner

COMMUNICATION RECEIVER AND METHOD

CROSS-REFERENCE TO RELATED APPLICATIONS

This application is a continuation of International Application No. PCT/EP2015/059859, filed on May 5, 2015, the disclosure of which is hereby incorporated by reference in its entirety.

TECHNICAL FIELD

The present invention relates to a communication receiver and method. In particular, the present invention relates to a communication receiver and method for demodulating a plurality of frequency channels of a communication signal.

BACKGROUND

Carrier aggregation (CA) in wireless communications is becoming a key approach for increasing the bandwidth and data rate as well as optimally utilizing the generally fragmented spectra available in wireless communications (e.g., LTE, Wi-Fi). For non-contiguous CA (NC CA) to be a useful CA scenario receivers are required that support NC CA reception. A couple of receiver technologies are known that support NC CA reception, such as processing the entire band span covering all carriers, parallel processing of carriers and double complex processing of carriers. However, all of these known receiver technologies have a couple of disadvantages, such as local oscillator (LO) pulling and/or LO coupling in parallel processing and the need for wide band tunable IF filtering and relatively very high image rejection ratios in double complex processing, that have prevented these technologies from gaining widespread acceptance as suitable for non-contiguous CA.

Thus, there is a need for an improved communication receiver and method, in particular an improved communication receiver and method suitable for non-contiguous CA and not disadvantageously affected by LO pulling.

SUMMARY

It is an object of the present invention to provide an improved communication receiver and method, in particular an improved communication receiver and method suitable for non-contiguous CA and not disadvantageously affected by LO pulling and coupling or needing very wide band and high image rejecting processing circuitry that has many limitations.

This objective is achieved by the subject matter of the independent claims. Further implementation forms are provided in the dependent claims, the description and the figures.

According to a first aspect the invention relates to a communication receiver for demodulating a plurality of frequency channels of a communication signal, wherein the plurality of frequency channels are arranged within a spectral range of interest of the communication signal and wherein the spectral range of interest has a spectral bandwidth $\Delta f$ and is situated around a frequency $f_{RF}$. The communication receiver comprises a mixer being configured to mix the communication signal with a periodic mixing signal having a mixing frequency $f_C$ to obtain a mixed communication signal, wherein the mixed communication signal comprises a first frequency spectrum portion comprising the spectral region of interest situated around the frequency $f_{RF}+f_C$ and a second frequency spectrum portion comprising the spectral range of interest being situated around the frequency $f_{RF}-f_C$, a first demodulator being configured to demodulate a first frequency channel of the plurality of frequency channels within the spectral range of interest of the first frequency spectrum portion of the mixed communication signal on the basis of a first local oscillator frequency $f_{LO1}$, and a second demodulator being configured to demodulate a second frequency channel of the plurality of frequency channels within the spectral region of interest of the second frequency spectrum portion of the mixed communication signal on the basis of a second local oscillator frequency $f_{LO2}$.

A communication receiver according to the first aspect of the invention shifts the spectral region of interest of the communication signal to the frequencies $f_{RF}+f_C$ and $f_{RF}-f_C$ and, thus, allows further processing of the spectral region of interest at these two distant frequencies without LO pulling.

In a first possible implementation form of the communication receiver according to the first aspect of the invention the communication receiver further comprises a third demodulator being configured to demodulate a third frequency channel of the plurality of frequency channels within the spectral range of interest of the communication signal on the basis of a third local oscillator frequency $f_{LO3}$.

Such a communication receiver advantageously makes use of the original signal as well, thus, providing for an efficient communication receiver.

In a second possible implementation form of the first implementation form of the first aspect of the invention the first frequency channel is centered at a frequency $f_1$, the second frequency channel is centered at a frequency $f_2$, the third frequency channel is centered at a frequency $f_3$, and the first, second and third local oscillator frequencies are given by $f_{LO1}=f_1+f_C$, $f_{LO2}=f_2-f_C$ and $f_{LO3}=f_3$, respectively.

In a third possible implementation form of the first or second implementation form of the first aspect of the invention the communication receiver further comprises a first local oscillator configured to provide a first local oscillator signal having the first local oscillator frequency $f_{LO1}$, a second local oscillator configured to provide a second local oscillator signal having the second local oscillator frequency $f_{LO2}$ and a third local oscillator configured to provide a third local oscillator signal having the third local oscillator frequency $f_{LO3}$.

This implementation form provides an efficient communication receiver, where the LO signals are provided by local oscillators operating at fairly distant frequencies such that no risk of LO pulling exists.

In a fourth possible implementation form of any one of the first to third implementation form of the first aspect of the invention the first, the second or the third demodulator comprises a demodulator mixer, wherein the demodulator mixer of the first demodulator is configured to mix the mixed communication signal with a mixing signal having the first local oscillator frequency $f_{LO1}$, wherein the demodulator mixer of the second demodulator is configured to mix the mixed communication signal with a mixing signal having the second local oscillator frequency $f_{LO2}$, and wherein the demodulator mixer of the third demodulator is configured to mix the communication signal with a mixing signal having the third local oscillator frequency $f_{LO3}$.

In such a communication receiver the demodulator mixer allows for isolating, i.e. downmixing a respective frequency or communication channel of the spectral region of interest. The demodulator mixer can be implemented in the form of a complex output mixer.

In a fifth possible implementation form of the fourth implementation form of the first aspect of the invention the first, the second or the third demodulator further comprises a low-pass filter being configured to filter the output of the demodulator mixer of the respective demodulator.

A low-pass filter downstream of the (complex) down-conversion removes unwanted frequency components from the communication signal.

In a sixth possible implementation form of the first aspect of the invention as such or any one of the first to fifth implementation form thereof the communication receiver further comprises a multi-band-pass filter being configured to receive the mixed communication signal and to provide the mixed communication signal filtered around the frequency $f_{RF}+f_C$ to the first demodulator and the mixed communication signal filtered around the frequency $f_{RF}-f_C$ to the second demodulator. Such filtering can suppress harmful demodulation by $f_{LO2}$ coupling onto $f_{LO1}$ signal and $f_{LO1}$ coupling onto $f_{LO2}$.

The multi-band-pass filter of such a communication receiver provides for a beneficial frequency band separation downstream of the multi-band-pass filter. The multi-band-pass filter can be implemented, for instance, as a duplexer providing two different frequency bands or as a quad-filter providing four different frequency bands.

In a seventh possible implementation form of the first aspect of the invention as such or any one of the first to sixth implementation form thereof the communication receiver further comprises a low noise amplifier being configured to amplify the communication signal.

This implementation form provides an efficient communication receiver allowing for the reception of weak communication signals.

In an eighth possible implementation form of the seventh implementation form of the first aspect of the invention the mixer is a passive mixer.

In a ninth possible implementation form of the eighth implementation form of the first aspect of the invention the communication receiver is configured to operate in current mode.

Such a communication receiver comprising a passive mixer and being operated in current mode provides for an advantageous band separation without the need for a multi-band-pass filter, such as a duplexer.

In a tenth possible implementation form of the first aspect of the invention as such or any one of the first to ninth implementation form thereof the communication receiver further comprises a band-pass filter configured to filter the communication signal, wherein the bandwidth of the band-pass filter is approximately equal to the spectral bandwidth $\Delta f$ of the spectral region of interest of the communication signal and wherein the band-pass filter is situated around the frequency $f_{RF}$.

Such a communication receiver allows rejecting unwanted images of the spectral region of interest. Alternatively, the band-pass filter can be omitted if the mixer is implemented as an image reject mixer.

In an eleventh possible implementation form of the first aspect of the invention as such or any one of the first to tenth implementation form thereof the periodic mixing signal is a sinusoidal mixing signal.

Such a communication receiver allows for an easy provision of the periodic mixing signal. The frequency of the mixing signal fc can be chosen such that fc and its harmonics do not interfere with the re-centered spectral ranges of interest of the communication signal.

In a twelfth possible implementation form of the first aspect of the invention as such or any one of the first to tenth implementation form thereof the periodic mixing signal is a square-wave signal.

Such a communication receiver allows to process more than three frequency or communication channels, namely 5, 7 or more channels, provided a corresponding number of LO signals is available.

According to a second aspect the invention relates to a communication method of demodulating a plurality of frequency channels of a communication signal, wherein the plurality of frequency channels are arranged within a spectral range of interest of the communication signal and wherein the spectral range of interest has a spectral bandwidth $\Delta f$ and situated around a frequency $f_{RF}$. The communication method comprises the steps of: mixing the communication signal with a periodic mixing signal having a mixing frequency $f_C$ to obtain a mixed communication signal, wherein the mixed communication signal comprises a first frequency spectrum portion comprising the spectral range of interest being situated around the frequency $f_{RF}+f_C$ and a second frequency spectrum portion comprising the spectral range of interest being situated around the frequency $f_{RF}-f_C$, demodulating a first frequency channel of the plurality of frequency channels within the spectral range of interest of the first frequency spectrum portion of the mixed communication signal on the basis of a first local oscillator frequency $f_{LO1}$, and demodulating a second frequency channel of the plurality of frequency channels within the spectral range of interest of the second frequency spectrum portion of the mixed communication signal on the basis of a second local oscillator frequency $f_{LO2}$.

The communication method according to the second aspect of the invention can be performed by the communication receiver according to the first aspect of the invention. Further features of the communication method according to the second aspect of the invention result directly from the functionality of the communication receiver according to the first aspect of the invention and its different implementation forms.

According to a third aspect the invention relates to a computer program comprising program code for performing the method according to the second aspect of the invention when executed on a computer.

The invention can be implemented in hardware and/or software.

BRIEF DESCRIPTION OF THE DRAWINGS

Further embodiments of the invention will be described with respect to the following figures, in which.

DETAILED DESCRIPTION OF EMBODIMENTS

In the following detailed description, reference is made to the accompanying drawings, which form a part of the disclosure, and in which are shown, by way of illustration, specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
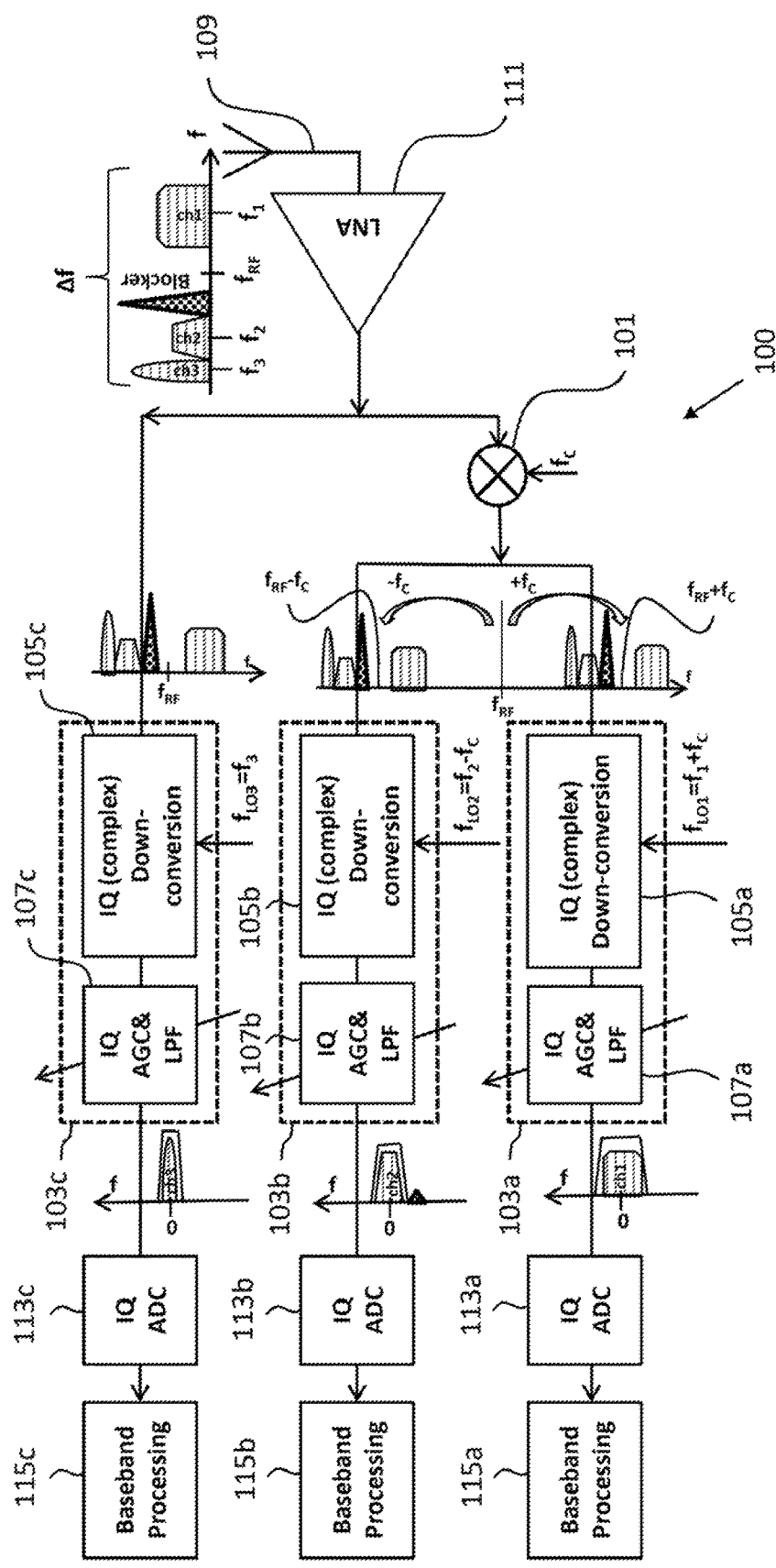
FIG. 1 shows a schematic diagram of a communication receiver according to an embodiment.

FIG. 1 shows a schematic diagram of a communication receiver 100 according to an embodiment. The communication receiver 100 is configured to demodulate a plurality of frequency channels of a communication signal, wherein the plurality of frequency channels are arranged within a spectral range of interest of the communication signal and wherein the spectral range of interest has a spectral bandwidth $\Delta f$ and situated around a frequency $f_{RF}$. In an embodiment, the communication receiver 100 comprises an antenna 109 for receiving the communication signal. An exemplary spectral range of interest comprising three frequency or communication channels identified as "ch1", "ch2" and "ch3" and an unwanted blocker frequency channel is shown in the upper right corner of FIG. 1 and in more detail at the upper end of FIG. 2.

The communication receiver 100 comprises a mixer 101 being configured to mix the communication signal with a periodic mixing signal having a mixing frequency $f_C$ to obtain a mixed communication signal. In an embodiment, the periodic mixing signal is a sinusoidal mixing signal. The frequency of the mixing signal $f_c$ can be chosen such that $f_c$ and its harmonics do not interfere with the re-centered spectral ranges of interest of the communication signal, as will be discussed in more detail below.

Figure 2:
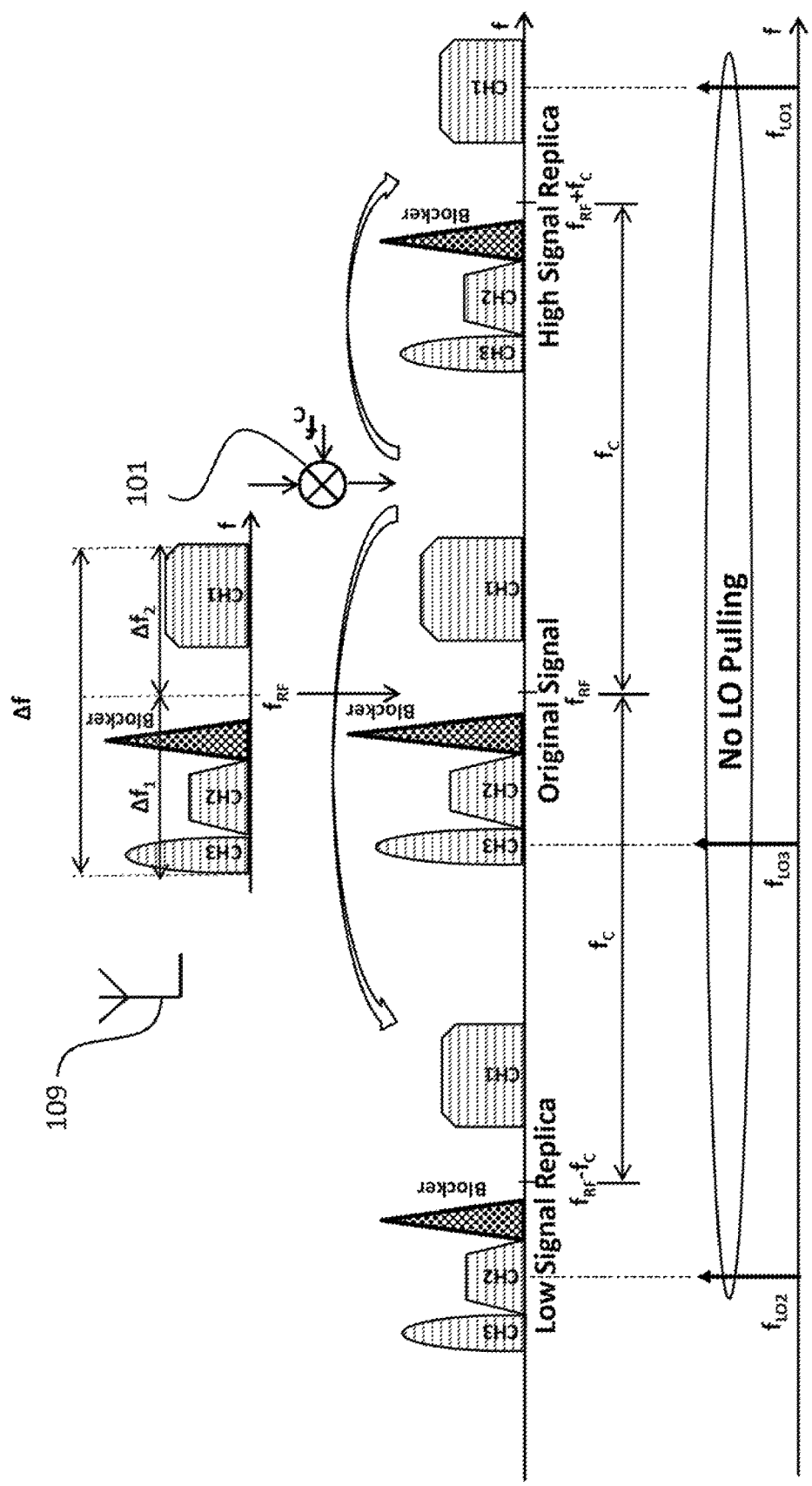
FIG. 2 shows a schematic diagram illustrating the processing of a spectral range of interest of a communication signal by the communication receiver of FIG. 1.

As indicated in FIG. 1 and in more detail in FIG. 2, the mixed communication signal comprises a first frequency spectrum portion comprising the spectral region of interest situated around the frequency $f_{RF}+f_C$ and a second frequency spectrum portion comprising the spectral range of interest being situated around the frequency $f_{RF}-f_C$.

The communication receiver 100 further comprises a first demodulator 103a being configured to demodulate a first frequency channel, for instance, the frequency or communication channel "ch1" shown in FIGS. 1 and 2, of the plurality of frequency channels within the spectral range of interest of the first frequency spectrum portion of the mixed communication signal on the basis of a first local oscillator frequency $f_{LO1}$ and a second demodulator 103b being configured to demodulate a second frequency channel, for instance, the frequency or communication channel "ch2" shown in FIGS. 1 and 2, of the plurality of frequency channels within the spectral region of interest of the second frequency spectrum portion of the mixed communication signal on the basis of a second local oscillator frequency $f_{LO2}$.

In an embodiment, the communication receiver 100 further comprises a third demodulator 103c being configured to demodulate a third frequency channel, for instance, the frequency or communication channel "ch3" shown in FIGS. 1 and 2, of the plurality of frequency channels within the spectral range of interest of the communication signal on the basis of a third local oscillator frequency $f_{LO3}$.

In an embodiment, the first frequency channel or communication channel "ch1" is centered at frequency $f_1$, the second frequency or communication channel "ch2" is centered at frequency $f_2$ and the third frequency or communication channel "ch3" is centered at frequency $f_3$. In this case the first, second and third local oscillator frequencies are given by $f_{LO1}=f_1+f_C$, $f_{LO2}=f_2-f_C$ and $f_{LO3}=f_3$, respectively. In an embodiment, the communication receiver 100 further comprises a first local oscillator configured to provide a first local oscillator signal having the first local oscillator frequency $f_{LO1}$, a second local oscillator configured to provide a second local oscillator signal having the second local oscillator frequency $f_{LO2}$ and a third local oscillator configured to provide a third local oscillator signal having the third local oscillator frequency $f_{LO3}$.

In an embodiment, the first, second and/or third demodulator 103a-c can comprise a demodulator mixer 105a-c. The demodulator mixer 105a of the first demodulator 103a is configured to mix the mixed communication signal with a mixing signal having the first local oscillator frequency $f_{LO1}$. The demodulator mixer 105b of the second demodulator 103b is configured to mix the mixed communication signal with a mixing signal having the second local oscillator frequency $f_{LO2}$. The demodulator mixer 105c of the third demodulator 103c is configured to mix the communication signal with a mixing signal having the third local oscillator frequency $f_{LO3}$. The demodulator mixers 105a-c allow for isolating by downmixing a respective frequency or communication channel of the spectral region of interest. The demodulator mixers 105a-c can be implemented in the form of a complex output mixer. As shown in FIG. 1, the first, second and third demodulator 103a-c and the demodulator mixers 105a-c can be configured to process an in-phase (I) and a quadrature (Q) component of the communication signal.

In an embodiment, the first, the second and/or the third demodulator 103a-c further comprise a low-pass filter (LPF) 107a-c being configured to filter the output of the demodulator mixer of the respective demodulator for removing unwanted frequency components from the communication signal downstream of the low-pass filter 107a-c. In an embodiment, the low pass filter 107a-c can include an automatic gain control (AGC), as shown in FIG. 1.

Once the frequency or communication channels have been demodulated by the respective first, second and third demodulator 103a-c the demodulated frequency or communication channels, for instance, the frequency or communication channels "ch1", "ch2" and "ch3" shown in FIGS. 1 and 2, can be further processed by a respective analog-to-digital converter (ADC) 113a-c and/or a respective baseband processing unit 115a-c of the communication receiver 100.

As shown in FIG. 1, in an embodiment the communication receiver 100 comprises downstream of the antenna 109 and upstream of the mixer 101 a low noise amplifier (LNA) 111 being configured to amplify the communication signal received by the antenna 109.

Figure 3:
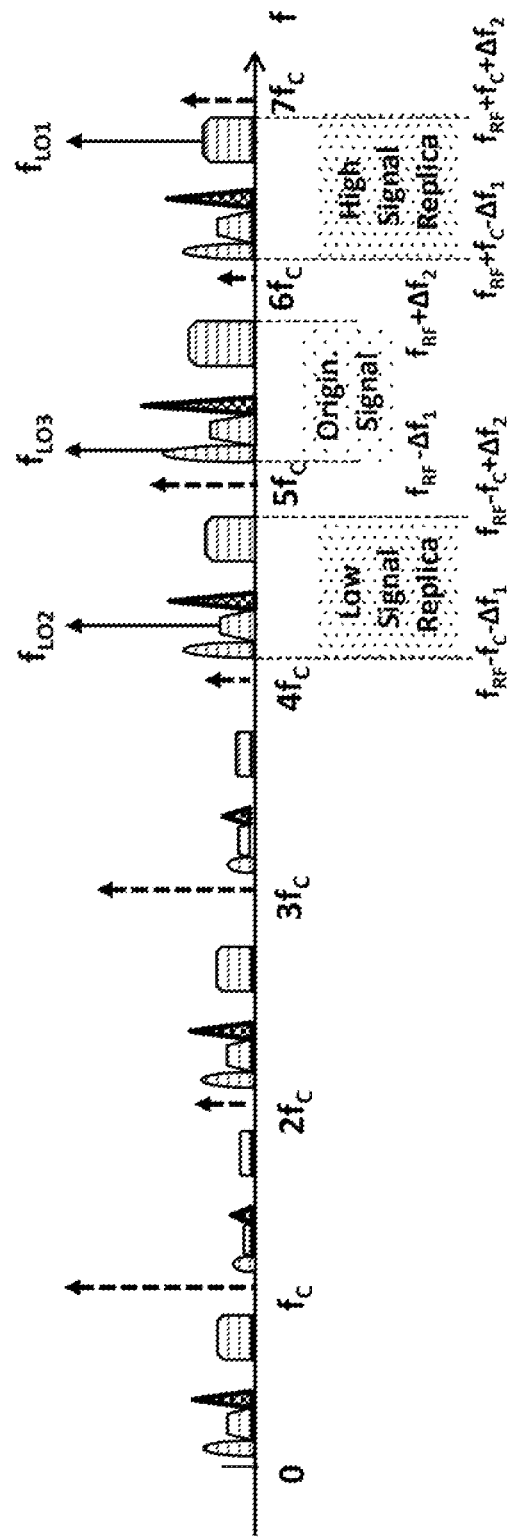
FIG. 3 shows a schematic diagram illustrating a detail of the processing of a spectral range of interest of a communication signal by the communication receiver of FIG. 1.

FIG. 2 shows a schematic diagram illustrating the processing of a spectral range of interest of a communication signal by the communication receiver 100 of FIG. 1. As can be taken from FIG. 2, the communication receiver 100 of FIG. 1 provides for a sufficient separation between the local oscillator frequencies $f_{LO1}$, $f_{LO2}$ and $f_{LO3}$ for down-mixing the exemplary frequency or communication channels "ch1", "ch2" and "ch3" so that essentially no or only very little LO pulling between the local oscillator frequencies $f_{LO1}$, $f_{LO2}$ and $f_{LO3}$ occurs. FIG. 3 shows schematically an exemplary relation between the local oscillator frequencies $f_{LO1}$, $f_{LO2}$ and $f_{LO3}$ and the related signal replicas situated around $f_{RF}-f_C$, $f_{RF}$ and $f_{RF}+f_C$ as well as the separation from the mixing frequency $f_C$ and its harmonic multiples thereof. Superior receiver performance and improved frequency plan flexibility will be achieved if frequency $f_C$ and its multiples will not interfere with the original communication signal and the re-centered replicas (to be demodulated by the demodulator mixers 105a-c). Further replicas of the spectral region of interest are also shown.

Figure 4:
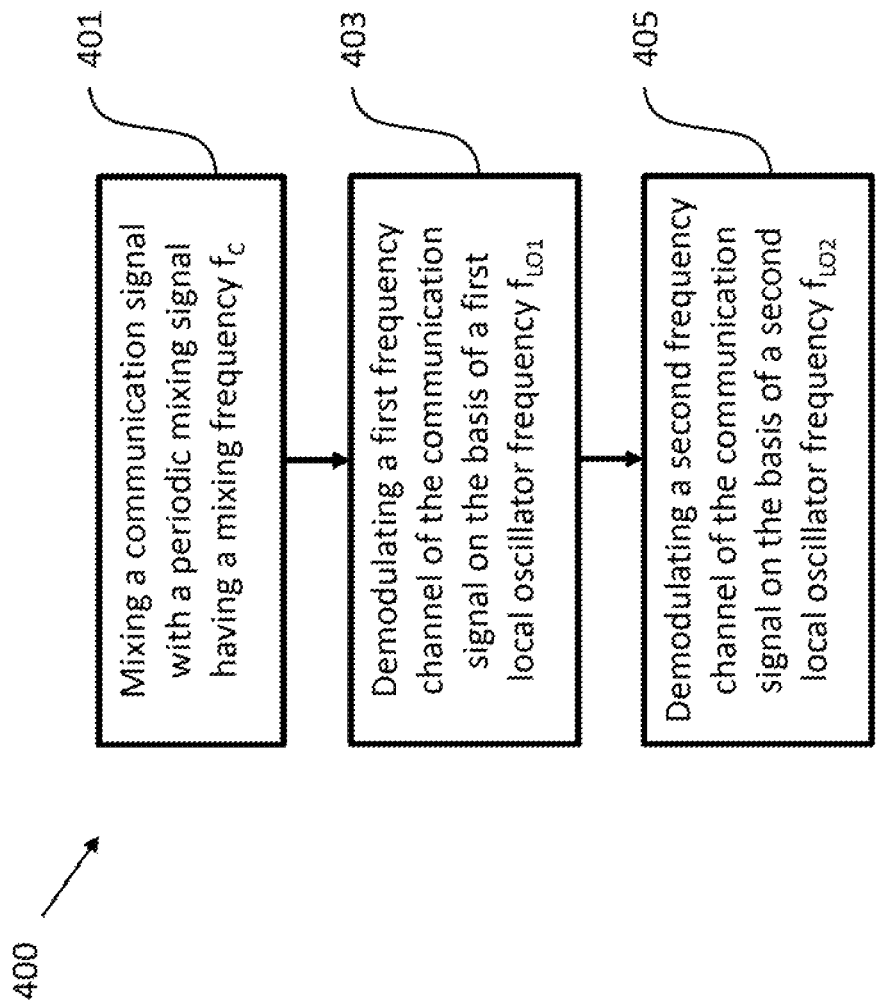
FIG. 4 shows a schematic diagram of a communication method according to an embodiment.

FIG. 4 shows a schematic diagram of a communication method 400 according to an embodiment. The communication method 400 demodulates a plurality of frequency channels of a communication signal, wherein the plurality of frequency channels are arranged within a spectral range of interest of the communication signal and wherein the spectral range of interest has a spectral bandwidth $\Delta f$ and is centered at a frequency $f_{RF}$.

The communication method 400 comprises the following steps. In a first step 401 the communication signal is mixed with a periodic mixing signal having a mixing frequency $f_C$ to obtain a mixed communication signal, wherein the mixed communication signal comprises a first frequency spectrum portion comprising the spectral range of interest being situated around a frequency $f_{RF}+f_C$ and a second frequency spectrum portion comprising the spectral range of interest being situated around a frequency $f_{RF}-f_C$. In a second step 403 a first frequency channel of the plurality of frequency channels within the spectral range of interest of the first frequency spectrum portion of the mixed communication signal is demodulated on the basis of a first local oscillator frequency $f_{LO1}$. In a third step 405 a second frequency channel of the plurality of frequency channels within the spectral range of interest of the second frequency spectrum portion of the mixed communication signal is demodulated on the basis of a second local oscillator frequency $f_{LO2}$.

One skilled in the art appreciates that at least some of the above steps can be performed serially, in parallel, or a combination thereof. For example, steps 403 and 405 can be performed in parallel to each other and in series vis-à-vis step 401.

Figure 5:
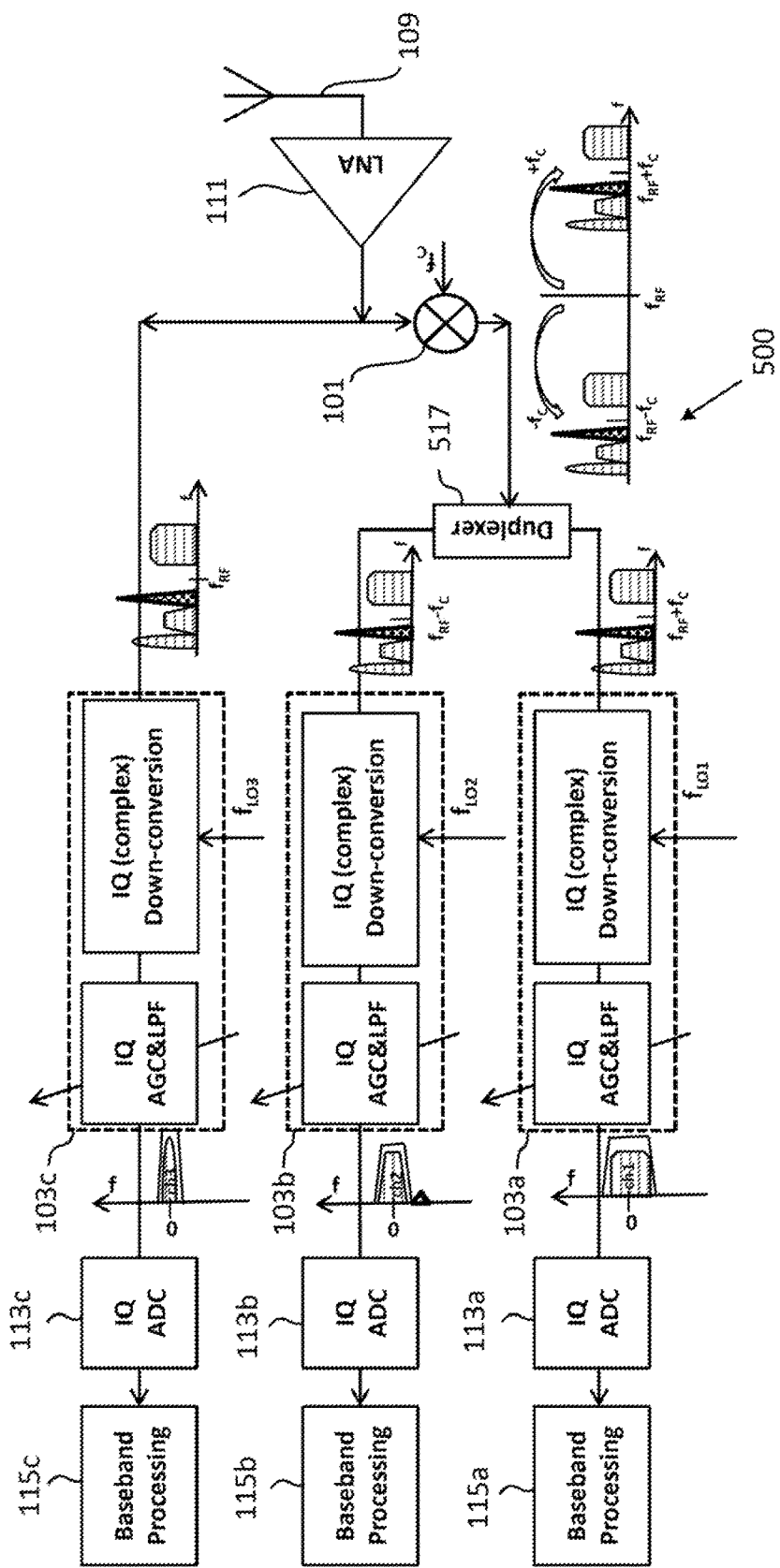
FIG. 5 shows a schematic diagram of a communication receiver according to an embodiment.

FIG. 5 shows a schematic diagram of a communication receiver 500 according to an embodiment. The main difference between the communication receiver 500 shown in FIG. 5 and the communication receiver 100 shown in FIG. 1 is that the communication receiver 500 further comprises a multi-band-pass filter 517 in the form of a duplexer downstream of the mixer 101 and upstream of the first and the second demodulator 103a, b. The duplexer 517 is configured to receive the mixed communication signal from the mixer 101 and to provide the mixed communication signal filtered around the frequency $f_{RF}+f_C$ to the first demodulator 103a and the mixed communication signal filtered around the frequency $f_{RF}-f_C$ to the second demodulator 103b. Thus, the duplexer 517 allows discarding unwanted frequency components.

Figure 6:
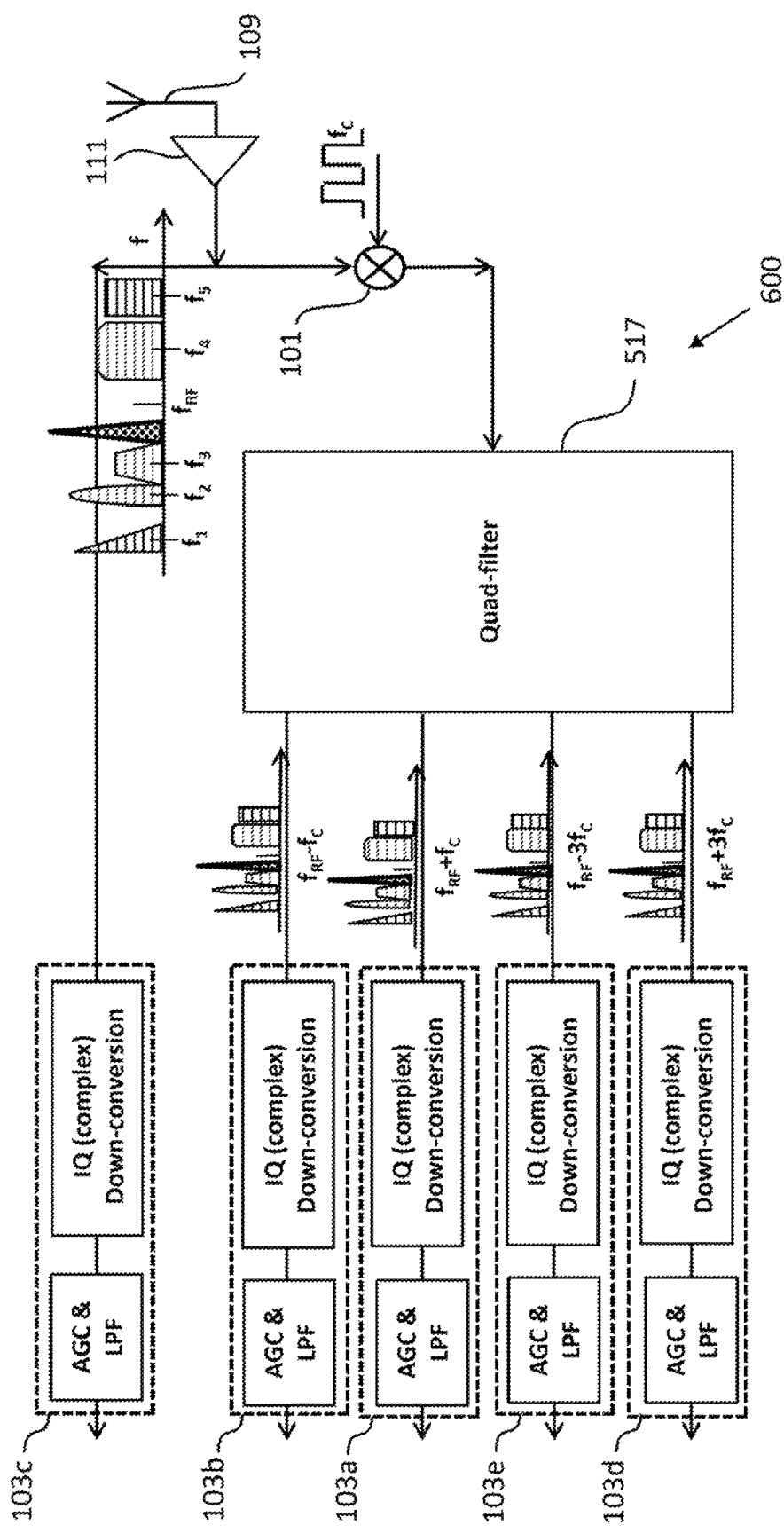
FIG. 6 shows a schematic diagram of a communication receiver according to an embodiment.

A similar embodiment of a communication receiver is shown in FIG. 6. Instead of having a multi-band-pass filter in the form of a duplexer 517, the communication receiver 600 shown in FIG. 6 comprises a multi-band-pass filter 517 in the form of a quad-filter downstream of the mixer 101. The quad-filter 517 is configured to receive the mixed communication signal from the mixer 101 and to provide the mixed communication signal filtered around the frequency $f_{RF}+f_C$ to the first demodulator 103a, the mixed communication signal filtered around the frequency $f_{RF}-f_C$ to the second demodulator 103b, the mixed communication signal filtered around the frequency $f_{RF}+3f_C$ to a fourth demodulator 103d and the mixed communication signal filtered around the frequency $f_{RF}-3f_C$ to a fifth demodulator 103e. As indicated in FIG. 6, the communication receiver 600 can process up to five frequency or communication channels located at respective frequencies $f_1$, $f_2$, $f_3$, $f_4$ and $f_4$ of the spectral region of interest.

Figure 7:
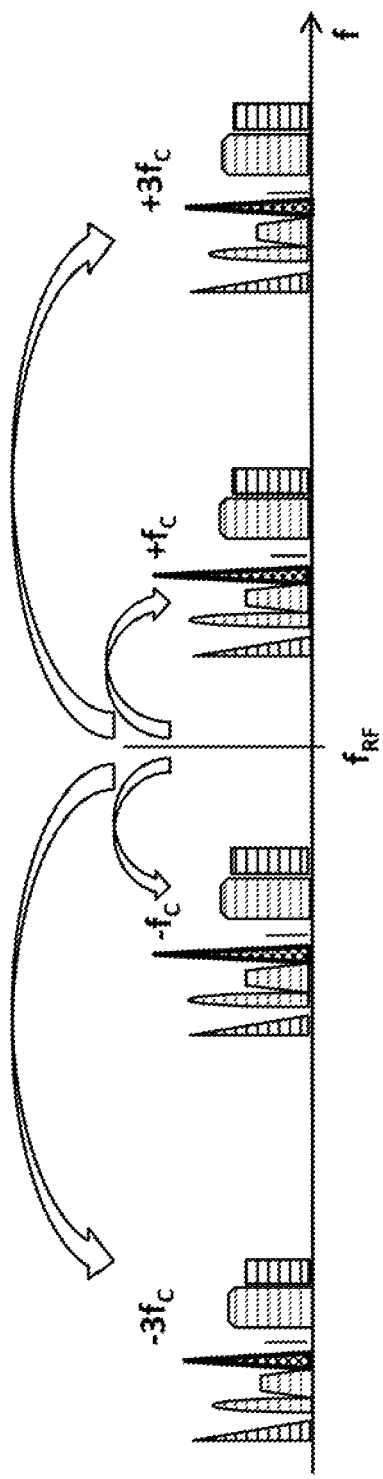
FIG. 7 shows a schematic diagram illustrating the processing of a spectral range of interest of a communication signal by the communication receiver of FIG. 6.

In an embodiment, the mixer 101 of the communication receiver 600 is operated using a periodic mixing signal in the form of a square-wave signal, as indicated in FIG. 6. As the person skilled in the art will appreciate, the use of such a mixing signal allows processing even more than five frequency or communication channels, provided a corresponding number of demodulators are available. FIG. 7 shows a schematic diagram illustrating the processing of a spectral range of interest of a communication signal by the communication receiver 600 of FIG. 6.

Figure 8:
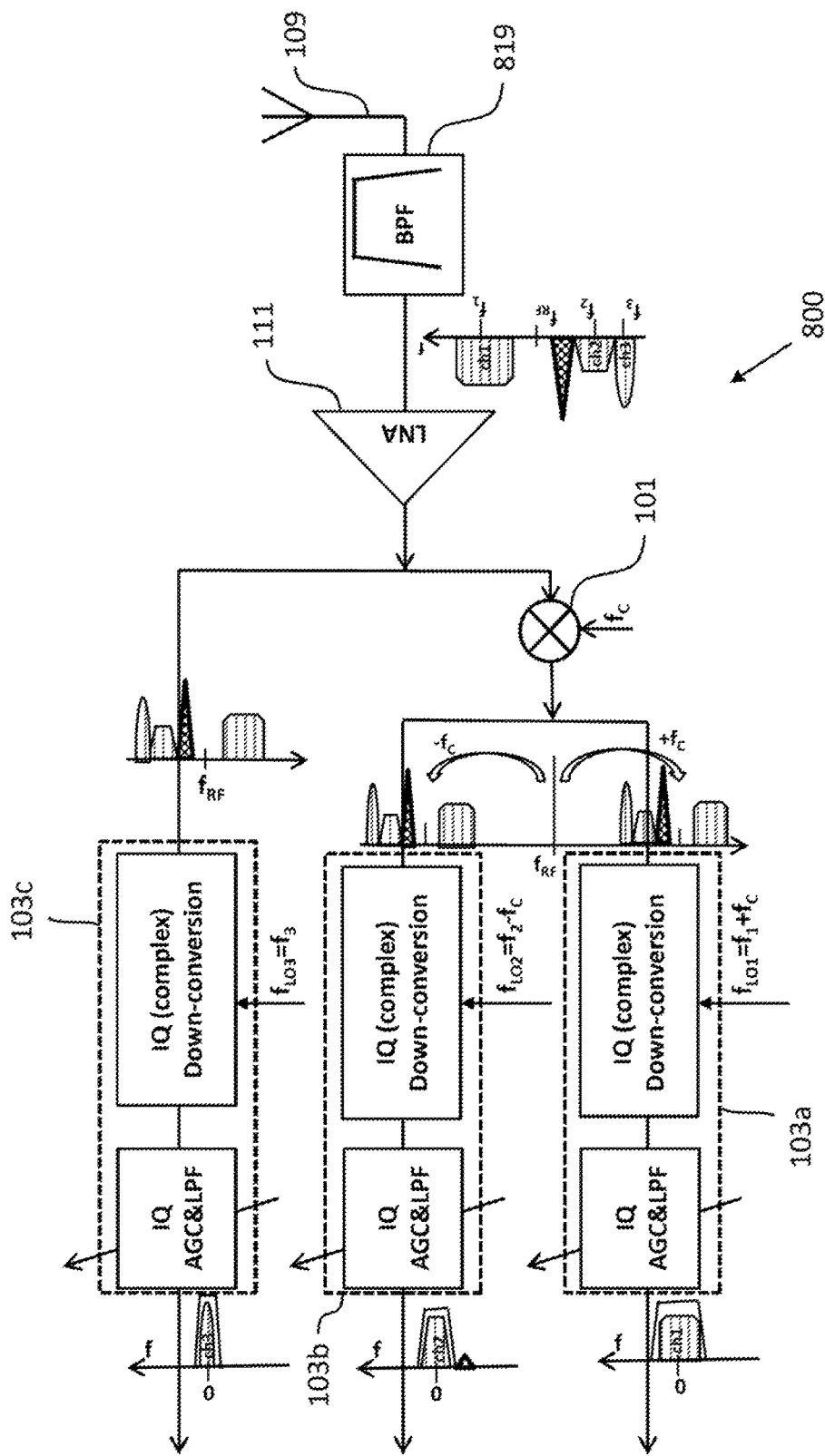
FIG. 8 shows a schematic diagram of a communication receiver according to an embodiment.
Figure 9:
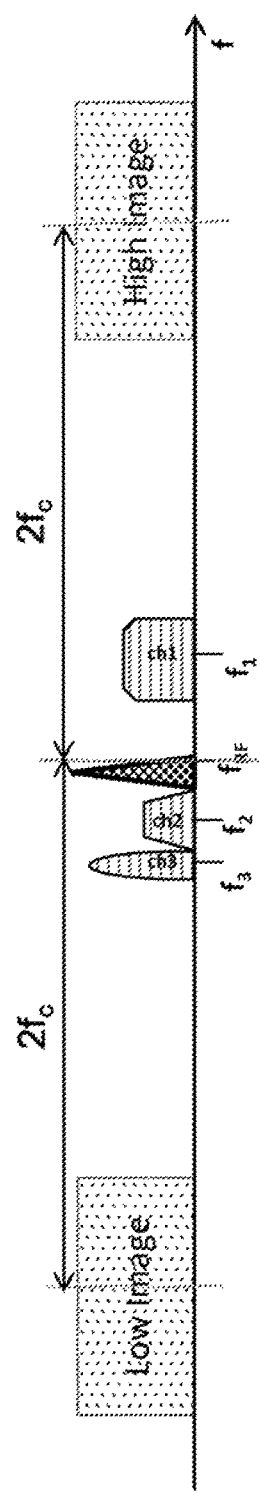
FIG. 9 shows a schematic diagram illustrating the processing of a spectral range of interest of a communication signal by the communication receiver of FIG. 8.

FIG. 8 shows a schematic diagram of a communication receiver 800 according to an embodiment. The main difference between the communication receiver 800 shown in FIG. 8 and the communication receiver 100 shown in FIG. 1 is that the communication receiver 800 further comprises a band-pass filter 819 configured to filter the communication signal. In an embodiment, the band-pass filter 819 is located downstream of the antenna 109 and upstream of the low noise amplifier 111. In an embodiment, the bandwidth of the band-pass filter 819 is approximately equal to the spectral bandwidth $\Delta f$ of the spectral region of interest of the communication signal and the band-pass filter 819 is situated around the frequency $f_{RF}$. As illustrated in FIG. 9, the use of the band-pass filter 819 allows discarding unwanted images of the spectral region of interest.

In an embodiment, the mixer 101 of the communication receivers 100, 500, 600 and 800 described above is implemented in the form of a passive mixer. In an embodiment, the communication receivers 100, 500, 600 and 800 are configured to operate in a current mode. Such a communication receiver comprising a passive mixer and being operated in current mode provides for an advantageous band separation without the need for a multi-band-pass filter.

Embodiments of the invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on transitory or non-transitory computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Thus, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in nonprogrammable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as "computer systems".

However, other modifications, variations and alternatives are also possible. The specifications and drawings are, accordingly, to be regarded in an illustrative rather than in a restrictive sense.

The invention claimed is:

1. A communication receiver for demodulating a plurality of frequency channels of a communication signal, the plurality of frequency channels being arranged within a spectral range of interest of the communication signal, the spectral range of interest having a spectral bandwidth $\Delta f$ and being situated around a frequency $f_{RF}$, the communication receiver comprising:
   a mixer being configured to mix the communication signal with a periodic mixing signal having a mixing frequency $f_C$ to obtain a mixed communication signal, wherein the mixed communication signal comprises a first frequency spectrum portion comprising the spectral region of interest being situated around a frequency $f_{RF}+f_C$ and a second frequency spectrum portion comprising the spectral range of interest being situated around a frequency $f_{RF}-f_C$;
   a first demodulator being configured to demodulate a first frequency channel of the plurality of frequency channels within the spectral range of interest of the first frequency spectrum portion of the mixed communication signal on the basis of a first local oscillator frequency $f_{LO1}$; and
   a second demodulator being configured to demodulate a second frequency channel of the plurality of frequency channels within the spectral region of interest of the second frequency spectrum portion of the mixed communication signal on the basis of a second local oscillator frequency $f_{LO2}$.

2. The communication receiver of claim 1, wherein the communication receiver further comprises a third demodulator being configured to demodulate a third frequency channel of the plurality of frequency channels within the spectral range of interest of the communication signal on the basis of a third local oscillator frequency $f_{LO3}$.

3. The communication receiver of claim 2, wherein the first frequency channel is centered at a frequency $f_1$, wherein the second frequency channel is centered at a frequency $f_2$, wherein the third frequency channel is centered at a frequency $f_3$, and wherein the first, second and third local oscillator frequencies are given by $f_{LO1}=f_1+f_C$, $f_{LO2}=f_2-f_C$ and $f_{LO3}=f_3$, respectively.

4. The communication receiver of claim 2, wherein the communication receiver further comprises a first local oscillator configured to provide a first local oscillator signal having the first local oscillator frequency $f_{LO1}$, a second local oscillator configured to provide a second local oscillator signal having the second local oscillator frequency $f_{LO2}$ and a third local oscillator configured to provide a third local oscillator signal having the third local oscillator frequency $f_{LO3}$.

5. The communication receiver of claim 2, wherein the first, the second or the third demodulator comprises a demodulator mixer, wherein the demodulator mixer of the first demodulator is configured to mix the mixed communication signal with a mixing signal having the first local oscillator frequency $f_{LO1}$, wherein the demodulator mixer of the second demodulator is configured to mix the mixed communication signal with a mixing signal having the second local oscillator frequency $f_{LO2}$, and wherein the demodulator mixer of the third demodulator is configured to mix the communication signal with a mixing signal having the third local oscillator frequency $f_{LO3}$.

6. The communication receiver of claim 5, wherein the first, the second or the third demodulator further comprises a low-pass filter being configured to filter the output of the demodulator mixer of the respective demodulator.

7. The communication receiver of claim 1, wherein the communication receiver further comprises a multi-band-pass filter being configured to receive the mixed communication signal and to provide the mixed communication signal filtered around the frequency $f_{RF}+f_C$ to the first demodulator and the mixed communication signal filtered around the frequency $f_{RF}-f_C$ to the second demodulator.

8. The communication receiver of claim 1, wherein the communication receiver further comprises a low noise amplifier being configured to amplify the communication signal.

9. The communication receiver of claim 8, wherein the mixer is a passive mixer.

10. The communication receiver of claim 9, wherein the communication receiver is configured to operate in current mode.

11. The communication receiver of claim 1, wherein the communication receiver further comprises a band-pass filter configured to filter the communication signal, wherein the bandwidth of the band-pass filter is approximately equal to the spectral bandwidth $\Delta f$ of the spectral region of interest of the communication signal and wherein the band-pass filter is situated around the frequency $f_{RF}$.

12. The communication receiver of claim 1, wherein the periodic mixing signal is a sinusoidal mixing signal.

13. The communication receiver of claim 1, wherein the periodic mixing signal is a square-wave signal.

14. A method of demodulating a plurality of frequency channels of a communication signal, the plurality of frequency channels being arranged within a spectral range of interest of the communication signal, the spectral range of interest having a spectral bandwidth $\Delta f$ and being situated around a frequency $f_{RF}$, the method comprising the steps of:
  mixing the communication signal with a periodic mixing signal having a mixing frequency $f_C$ to obtain a mixed communication signal, wherein the mixed communication signal comprises a first frequency spectrum portion comprising the spectral range of interest being situated around a frequency $f_{RF}+f_C$ and a second frequency spectrum portion comprising the spectral range of interest being situated around a frequency $f_{RF}-f_C$;
  demodulating a first frequency channel of the plurality of frequency channels within the spectral range of interest of the first frequency spectrum portion of the mixed communication signal on the basis of a first local oscillator frequency $f_{LO1}$; and
  demodulating a second frequency channel of the plurality of frequency channels within the spectral range of interest of the second frequency spectrum portion of the mixed communication signal on the basis of a second local oscillator frequency $f_{LO2}$.

15. A computer program product comprising a non-transitory computer-readable medium storing computer executable instructions, wherein the instructions comprises:
  instructions for mixing the communication signal with a periodic mixing signal having a mixing frequency $f_C$ to obtain a mixed communication signal, wherein the mixed communication signal comprises a first frequency spectrum portion comprising the spectral range of interest being situated around a frequency $f_{RF}+f_C$ and a second frequency spectrum portion comprising the spectral range of interest being situated around a frequency $f_{RF}-f_C$;
  instructions for demodulating a first frequency channel of the plurality of frequency channels within the spectral range of interest of the first frequency spectrum portion of the mixed communication signal on the basis of a first local oscillator frequency $f_{LO1}$; and
  instructions for demodulating a second frequency channel of the plurality of frequency channels within the spectral range of interest of the second frequency spectrum portion of the mixed communication signal on the basis of a second local oscillator frequency $f_{LO2}$.

* * * * *